United States Patent
Kincaid et al.

(10) Patent No.: US 6,517,094 B1
(45) Date of Patent: Feb. 11, 2003

(54) HYDRAULIC ANTI-ROLL SUSPENSION SYSTEM FOR MOTOR VEHICLES

(75) Inventors: Jeffrey L. Kincaid, Clarkston, MI (US); Jared Pulling, Ada, MI (US); Neil A. Wasylewski, Farmington Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/539,086

(22) Filed: Mar. 30, 2000

(51) Int. Cl.[7] ............................................. B60G 21/073
(52) U.S. Cl. ........................... 280/124.106; 280/5.508; 280/124.161; 280/124.162
(58) Field of Search ....................... 280/5.508, 124.106, 280/124.158, 124.159, 124.16, 124.161, 124.162; 267/186, 187, 191, 190; 188/282.2, 322.22

(56) References Cited

U.S. PATENT DOCUMENTS

| | | | | |
|---|---|---|---|---|
| 1,647,518 A | * | 11/1927 | Hawley, Jr. | .................. 267/186 |
| 1,893,800 A | * | 1/1933 | Home | ......................... 267/186 |
| 1,914,814 A | * | 6/1933 | Mercier | ...................... 267/186 |
| 2,253,190 A | * | 8/1941 | Mistral | ................ 280/124.106 |
| 2,779,587 A | * | 1/1957 | Thomas | ....................... 267/186 |
| 3,090,611 A | * | 5/1963 | Schultze | ..................... 267/186 |
| 3,233,909 A | * | 2/1966 | Boone | ................ 280/124.106 |
| 3,399,905 A | * | 9/1968 | Vogel | ................. 280/124.106 |
| 3,552,766 A | * | 1/1971 | Willich | ................ 280/124.127 |
| 3,563,566 A | * | 2/1971 | Weber | ................. 280/124.162 |
| 3,606,374 A | * | 9/1971 | Capgras | ............... 280/124.106 |
| 3,643,970 A | * | 2/1972 | Gauchet | .............. 280/124.106 |
| RE27,623 E | * | 4/1973 | Millican | ..................... 267/187 |
| 3,752,497 A | * | 8/1973 | Enke et al. | ............. 280/5.508 |
| 3,871,635 A | * | 3/1975 | Unruh et al. | ............ 267/64.16 |
| 4,095,822 A | | 6/1978 | Thornhill | .................... 280/702 |
| 4,270,771 A | | 6/1981 | Fujii | |
| 4,277,076 A | | 7/1981 | Hanna | |
| 4,606,551 A | | 8/1986 | Toti et al. | |
| 4,752,062 A | * | 6/1988 | Domenichini | ............... 267/186 |
| 4,773,672 A | | 9/1988 | Deroche | |

(List continued on next page.)

FOREIGN PATENT DOCUMENTS

| | | |
|---|---|---|
| DE | 19 47 232 | 4/1971 |
| DE | 41 15 717 | 11/1991 |
| EP | 0 730 988 | 9/1996 |
| GB | 2315716 A * | 2/1998 |
| JP | 04043113 A * | 2/1992 |
| WO | WO 90 10551 | 9/1990 |

Primary Examiner—Paul N. Dickson
Assistant Examiner—Ruth Ilan
(74) Attorney, Agent, or Firm—Harness, Dickey & Pierce, P.L.C.

(57) ABSTRACT

An anti-roll suspension system for a motor vehicle includes a plurality of double-acting cylinders coupling the unsprung and sprung portions of the vehicle. The upper fluid chamber of each cylinder is exclusively connected to the lower fluid chamber of the laterally opposite cylinder to create a fluid circuit having first and second portions which hydraulically link the cylinders. When the vehicle is subjected to a centrifugal force, the position of the sprung portion rotates relative to the position of the unsprung portion of the vehicle. This relative rotation is resisted by the tendency to substantially equalize the forces acting on pistons of the first and second cylinders, thereby reducing the tendency of the sprung portion of the vehicle to roll. An alternate embodiment includes a valve which is operable in either of a recirculating mode and cross-flow mode. When the vehicle is subjected to a centrifugal force which exceeds a predetermined value, the valve is actuated to establish the cross-flow mode and enable fluid to flow between the laterally opposite cylinders. The valve is otherwise maintained in its recirculating mode whereby fluid is circulated between the upper and lower fluid chambers of each individual cylinder.

12 Claims, 4 Drawing Sheets

U.S. PATENT DOCUMENTS

| | | | |
|---|---|---|---|
| 5,020,826 A | 6/1991 | Stecklein et al. | |
| 5,046,008 A | 9/1991 | Dieter | |
| 5,106,120 A | 4/1992 | Di Maria | |
| 5,116,077 A | 5/1992 | Karnopp et al. | |
| 5,139,104 A | 8/1992 | Moscicki | |
| 5,161,823 A * | 11/1992 | Davidson | 280/124.161 |
| 5,230,529 A | 7/1993 | Harvey-Bailey | |
| 5,431,430 A | 7/1995 | McCrea | |
| 5,447,332 A | 9/1995 | Heyring | |
| 5,480,188 A | 1/1996 | Heyring | |
| 5,562,305 A | 10/1996 | Heyring | |
| 5,785,344 A | 7/1998 | Vandewal et al. | |
| 5,794,966 A * | 8/1998 | MacLeod | 280/124.106 |
| 6,254,108 B1 * | 7/2001 | Germain et al. | 280/5.506 |

* cited by examiner

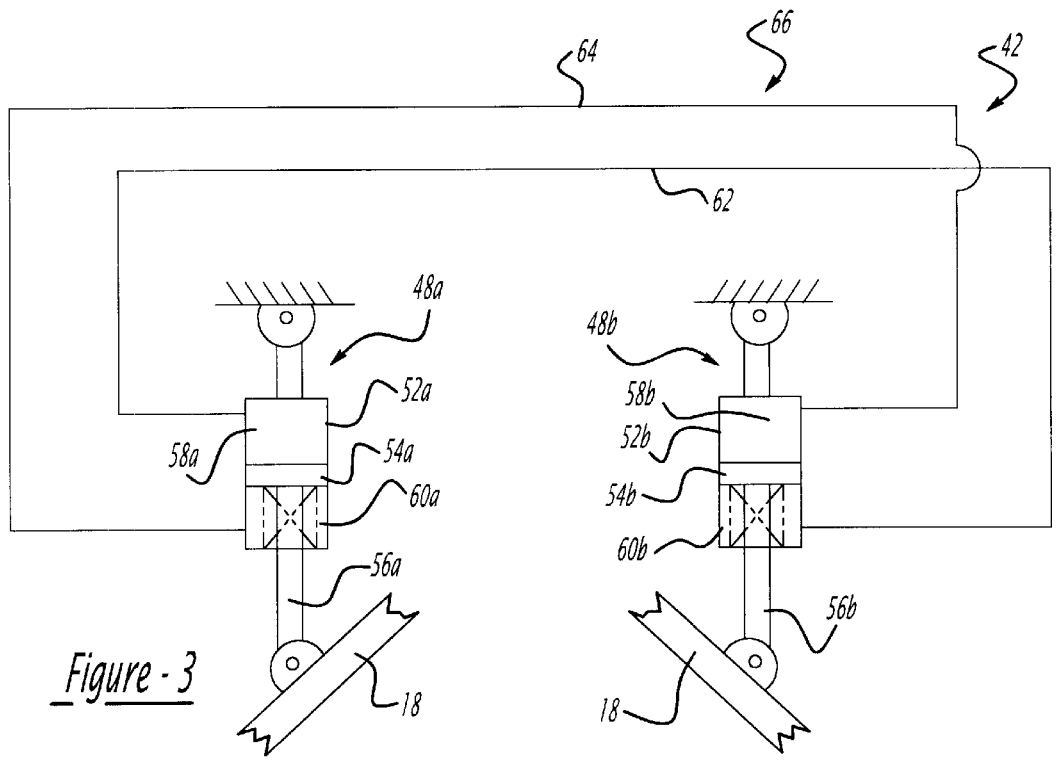
_Figure - 3_
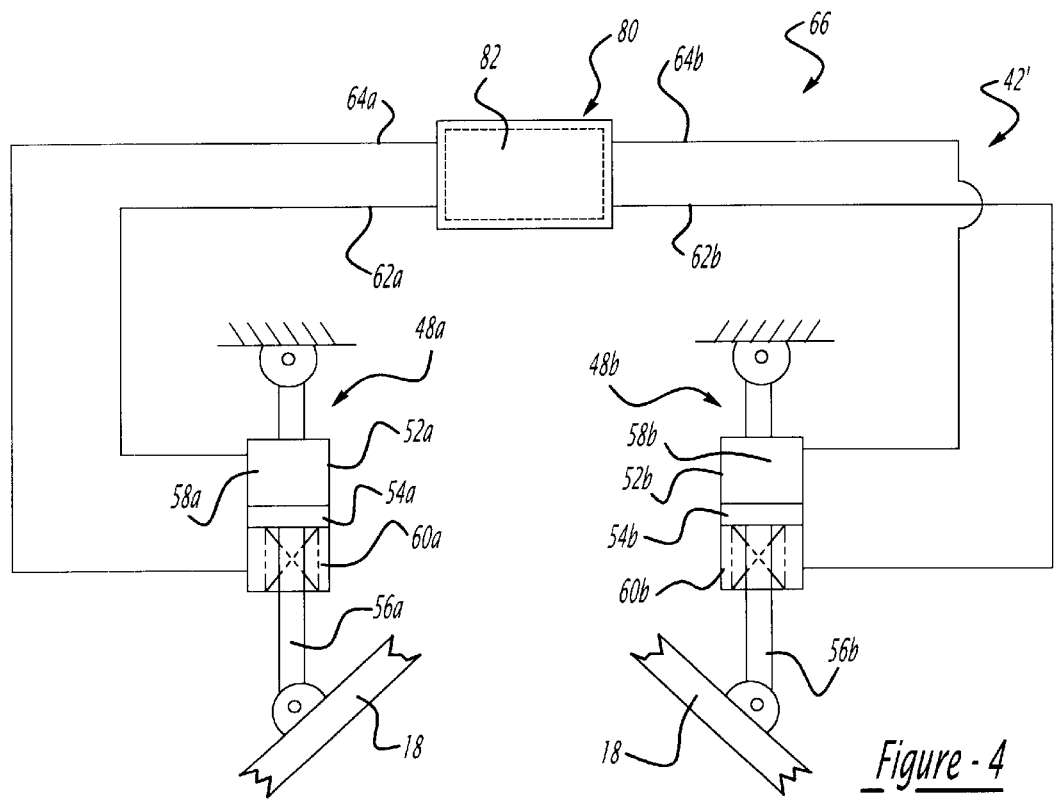
_Figure - 4_

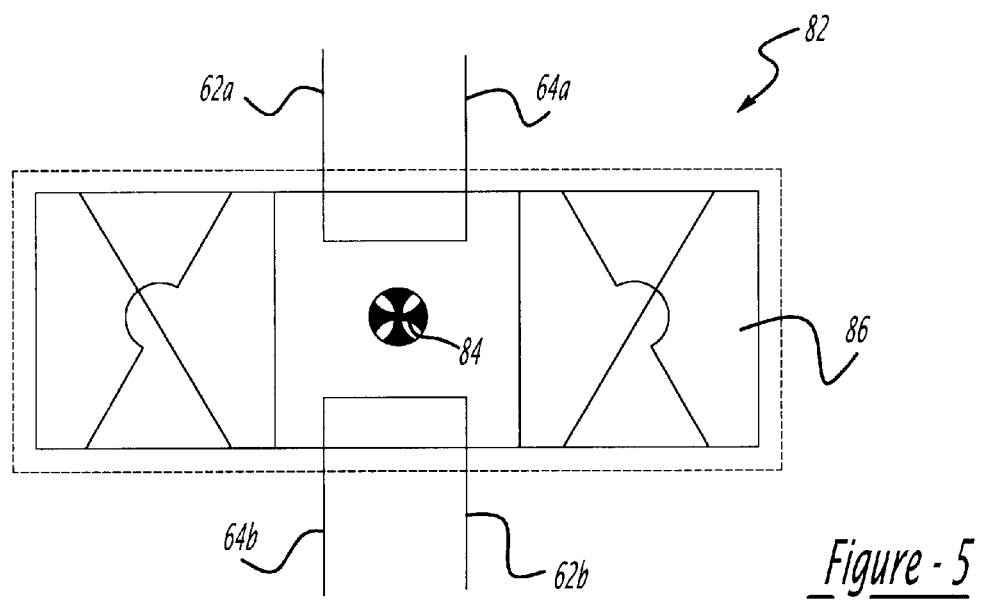
_Figure - 5_
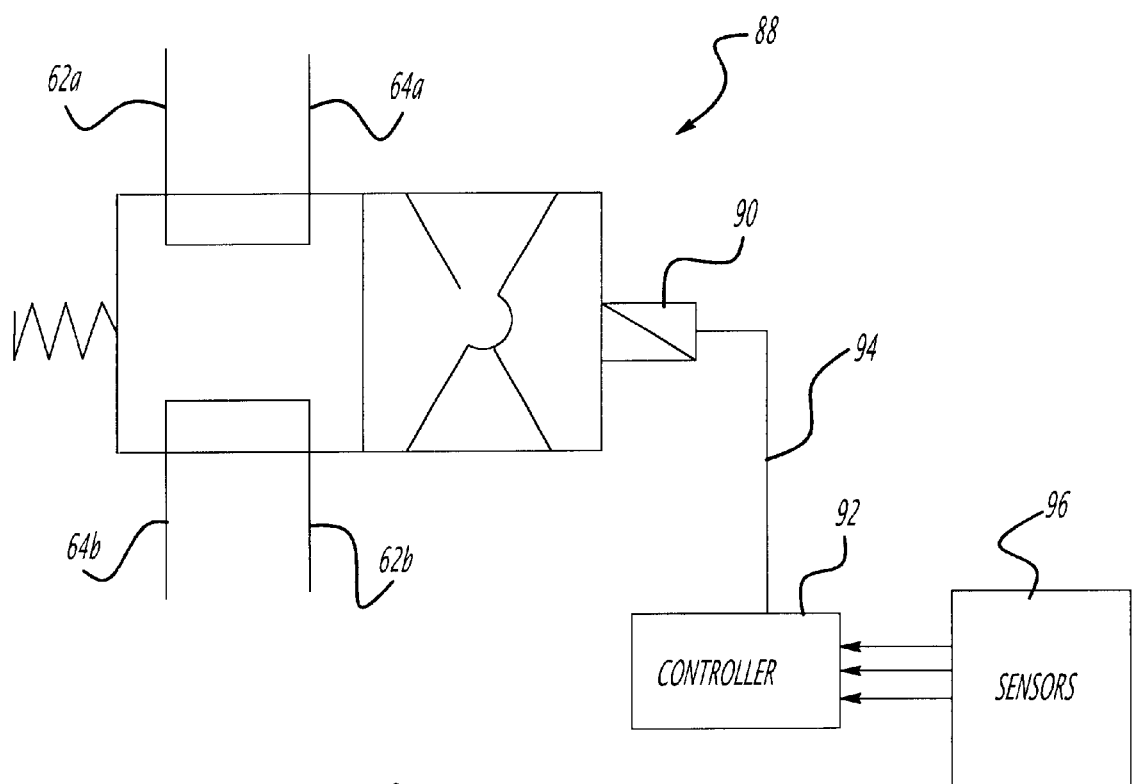
_Figure - 6_

HYDRAULIC ANTI-ROLL SUSPENSION SYSTEM FOR MOTOR VEHICLES

BACKGROUND OF THE INVENTION

1. Technical Field

The present invention relates generally to vehicle suspension systems and more particularly to a hydraulic anti-roll suspension system for a motor vehicle.

2. Discussion

Traditional vehicle suspension systems include resilient devices, such as coil springs, leaf springs and torsion bars, to flexibly support a portion of a vehicle and enable all of the wheels to maintain contract with the ground when traversing uneven terrain. Segregating the vehicle into unsprung and sprung portions in this manner is also useful for preventing severe impulsive forces from being transmitted to the vehicle occupants. It is known that as a vehicle travels around a corner, centrifugal forces acting on the vehicle tend to cause the sprung portion of the vehicle to roll. In severe instances, the effects of roll could cause instability and impede the ability of the driver to control the vehicle. Although the effects of roll are more pronounced with vehicles having a comparatively high center of gravity, such as vans or trucks, every vehicle is effected by roll.

To combat the effects of roll, anti-roll suspension systems have been developed. Their use, however, has not been widespread, as they have generally proved to be relatively expensive, complex, or inconvenient to manufacture, install or service. For instance, many of these systems require the use of a fluid power source, such as a hydraulic pump, which increases the load on the vehicle's power source and reduces fuel economy. Furthermore, most anti-roll suspension systems are not easily integrated into vehicles having conventional suspension system components. Consequently, there remains a need for a simplified anti-roll suspension system which is inexpensive and easily integrated into a vehicle equipped with otherwise conventional suspension system components.

SUMMARY OF THE INVENTION

It is a general object of the present invention to provide an effective and inexpensive anti-roll suspension system comprised of a pair of double-acting cylinders which are coupled between a sprung portion and an unsprung portion of a vehicle and which are interconnected by a fluid circuit.

It is another object of the present invention to provide an anti-roll suspension system that controls the roll angle of the sprung portion of the vehicle while the vehicle is cornering without decreasing passenger comfort during normal highway conditions.

It is a further object of the present invention to provide an anti-roll suspension system that is easily integrated into a vehicle having conventional suspension components.

In accordance with the present invention, an anti-roll suspension system for a motor vehicle is provided which includes a pair of double-acting cylinders coupling the unsprung and sprung portions of the vehicle. The upper fluid chamber of each cylinder is exclusively connected to the lower fluid chamber of the laterally opposite cylinder to create a fluid circuit having first and second portions which hydraulically interconnect the cylinders. When the vehicle is maneuvered around a corner, the position of the sprung portion rotates relative to the position of the unsprung portion of the vehicle. This relative rotation is resisted by the tendency to substantially equalize the forces acting on the cylinder pistons, thereby reducing the tendency of the sprung portion of the vehicle to roll. As such, anti-roll capabilities are provided without the need for costly fluid pumps which reduce the fuel economy of the vehicle.

In an alternate embodiment, a valve is included which is operable in either of a recirculating mode and a cross-flow mode. When the vehicle is subjected to a centrifugal force which exceeds a predetermined value, the valve is actuated to establish the cross-flow mode and enable fluid to flow between the laterally opposite cylinders. The valve is otherwise maintained in its recirculating mode whereby fluid is circulated between the upper and lower fluid chambers of each individual cylinder. Configuration of the suspension system in this manner controls roll during cornering maneuvers while preventing vertically directed forces encountered by an individual wheel during normal driving conditions from being transmitted to the laterally opposite wheel.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 3 is an enlarged diagrammatical view of the anti-roll system shown in FIG. 2;

FIG. 4 is a partial diagrammatical view of an anti-roll suspension system according to an alternate embodiment of the present invention showing a valve disposed in the fluid circuit for normally preventing the flow of fluid to laterally opposite cylinders;

FIG. 5 is a view of an inertia-sensitive valve suitable for use in the anti-roll suspension system of FIG. 4; and FIG. 6 is a diagrammatical view of an electrically-actuated valve suitable for use in the anti-roll system of FIG. 4.

DETAILED DESCRIPTION OF THE PREFERRED EMBODIMENT

In general, the present invention is directed toward a hydraulic anti-roll suspension system interconnected between the spring and unsprung portions of a motor vehicle. The hydraulic anti-roll suspension system is adapted to work in conjunction with conventional front and rear suspension systems. Thus, the present invention may be utilized in a wide variety of vehicular suspension systems and is not intended to be limited to the particular application described herein. Moreover, certain terminology is used in the following detailed description for convenience only and is not intended to be limiting.

Figure 1:
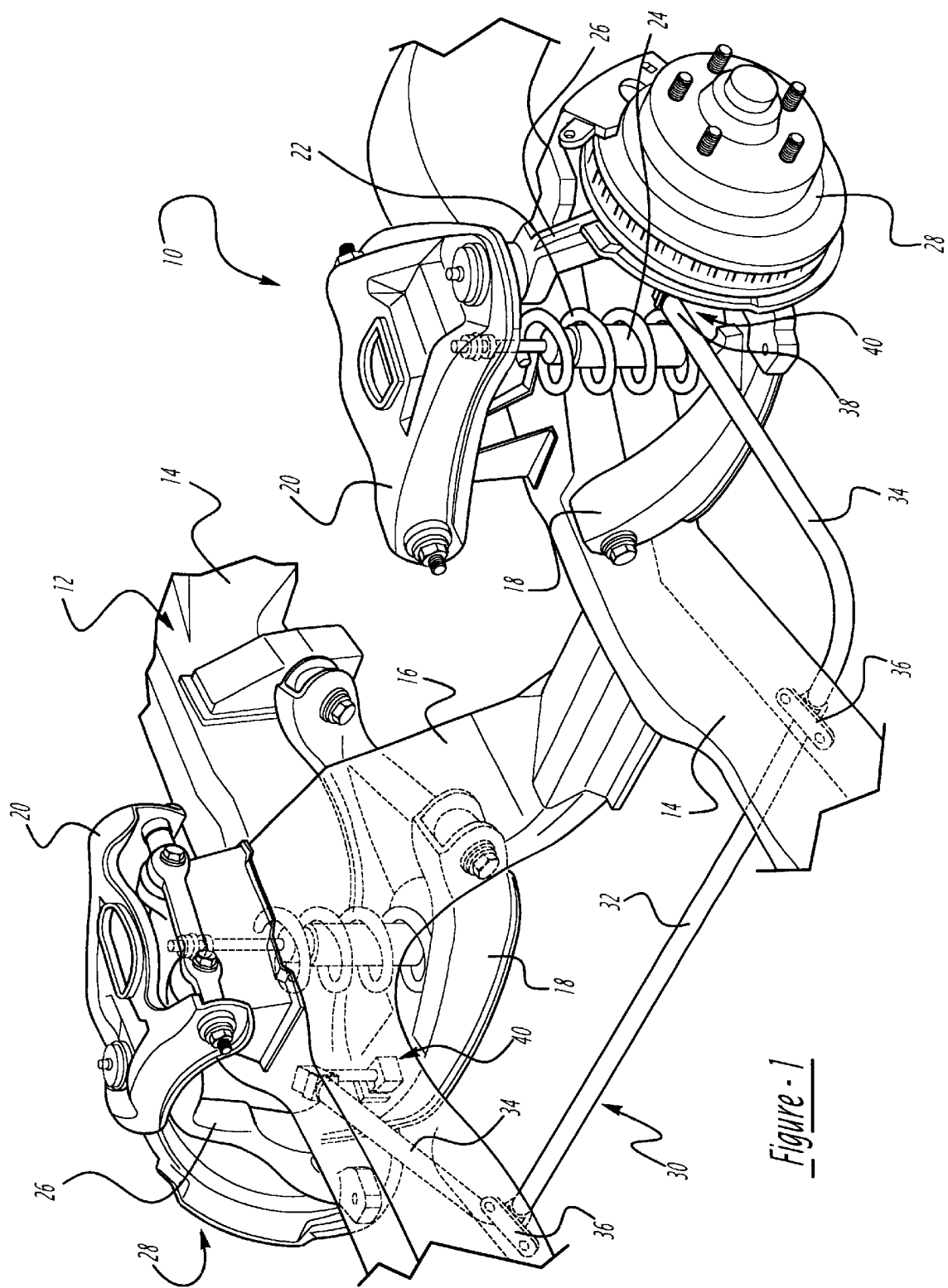
FIG. 1 is a perspective view of an exemplary front wheel suspension system into which the present invention is incorporated.

Turning now to the drawings, FIG. 1 shows an independent front wheel suspension system generally indicated at 10, of the type having upper and lower control arms and a strut assembly at each wheel which are suspended from the vehicle frame. Reference will be made to a vehicle frame in the present disclosure, yet those skilled in the art will recognize that many current vehicles do not have a frame as such but instead have regions of the body which act as an integrated frame structure. With this in mind, frame 12 is shown to partially include a pair of longitudinal side rails 14 and a crossbeam 16. Suspension system 10 includes a lower control arm 18 and an upper control arm 20 which are both pivotally attached to frame 12. A strut assembly having a helical coil spring 22 and a strut damper 24 is retained between an intermediate portion of lower control arm 18 and frame 12 to support the weight of the vehicle body and any loads which are transmitted through lower control arm 18. Upper control arm 20 is connected to lower control arm 18 by a steering knuckle 26. A hub and rotor assembly 28 is rotatably attached to a spindle portion (not shown) of steering knuckle 26 such that a wheel and tire (also not shown) may be mounted thereon. A stabilizer bar 30 is shown to include an elongated central segment 32 which extends laterally across the vehicle and a pair of arm segments 34 which extend longitudinally along the vehicle at each end of central segment 32. Central segment 32 is rotatably attached to frame rails 14 by a pair of to mounting brackets 36. A distal end 38 of each arm segment 34 is pivotably connected to a corresponding lower control arm 18 by an end link 40.

Figure 2:
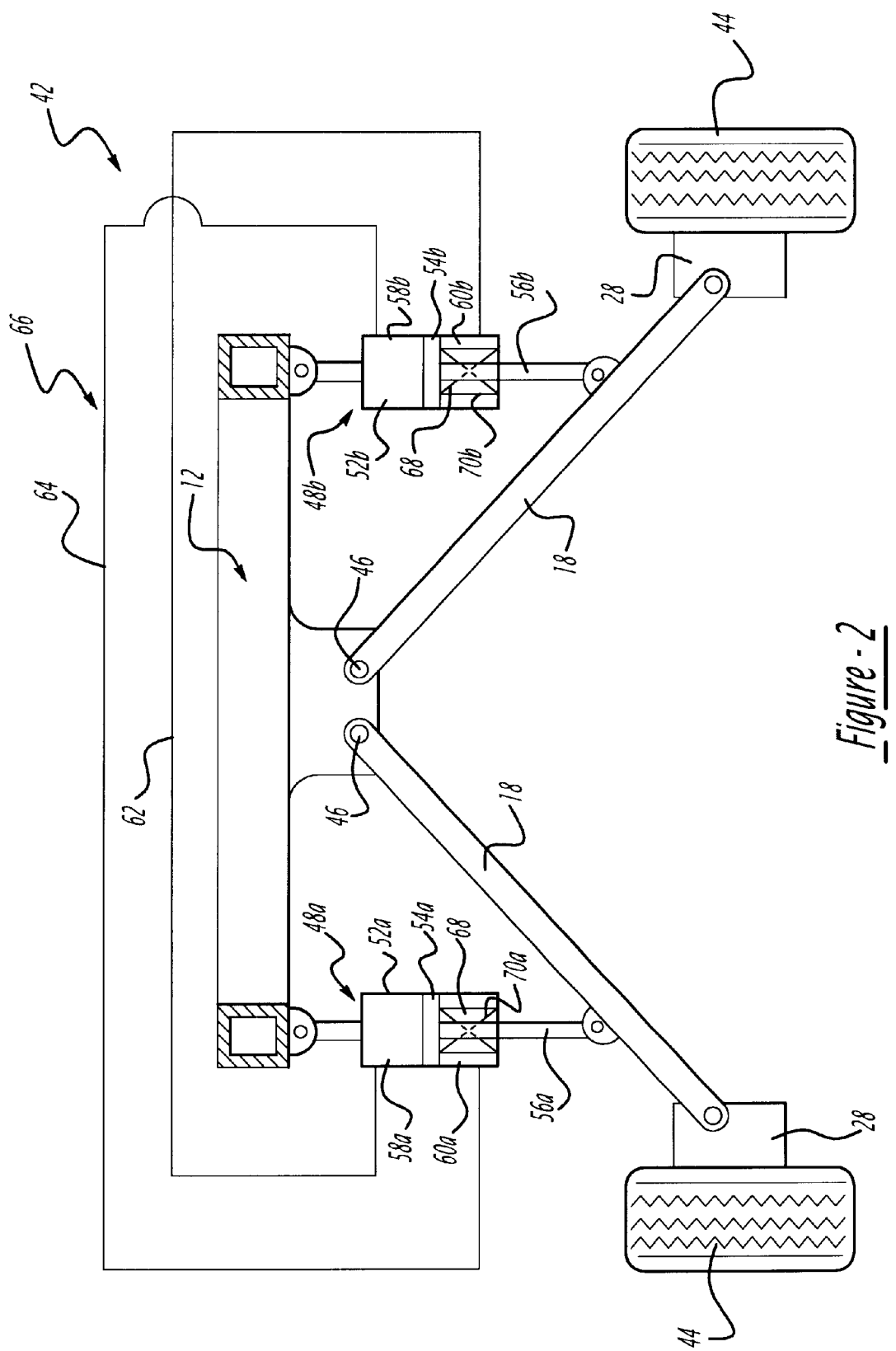
FIG. 2 is a diagrammatical view of the anti-roll suspension system of the present invention incorporated into the front end of an exemplary motor vehicle having suspension components linking the unsprung and sprung portions of the vehicle together.

Referring to FIG. 2, an anti-roll suspension system 42 is diagrammatically depicted in operative association with components of suspension system 10. Anti-roll suspension system 42 is arranged to couple the "sprung" portion of the vehicle to its "unsprung" portion. The sprung portion includes, among other things, frame 12 and the body (not shown) of the vehicle. As shown, the unsprung portion includes, among other things, lower control arms 18, spindles 28 and wheels 44. As is conventional, lower control arms 18 link the sprung portion to the unsprung portion. Each lower control arm 18 pivots about a pivot point 46 in response to a vertically directed force from its respective wheel 44, such as when the vehicle is operated over uneven terrain. As noted, suspension system 10 is installed between the sprung and unsprung portions so as to support the vehicle in each "corner" and dampens the relative movement of each wheel 44.

Anti-roll system 42 is shown in FIGS. 2 and 3 to include a pair of double-acting cylinders 48a and 48b, each being located in a laterally opposite corner from the other. Cylinder 48a includes a housing 52a, a piston 54a and a rod 56a.

Housing 52a and piston 54a combine to form an upper fluid chamber 58a and a lower fluid chamber 60a which vary in volume according to the position of piston 54a.

Similarly, cylinder 48b includes a housing 52b, a piston 54b and a rod 56b, with upper chamber 58b and lower fluid chamber 60b defined therein. Housings 52a and 52b are fixed to frame 12. Rods 56a and 56b couple lower control arms 18 to corresponding pistons 54a and 54b such that relative movement between the sprung and unsprung portions of the vehicle causes a corresponding vertical movement of pistons 54a and 54b. As seen, upper fluid chamber 58a of cylinder 48a is connected through a first fluid conduit 62 to lower fluid chamber 60b of cylinder 48b. Likewise, upper fluid chamber 58b of cylinder 48b is connected through a second fluid conduit 64 to lower fluid chamber 60a of cylinder 48a. Connection of cylinders 48a and 48b in this manner establishes a closed-loop fluid circuit 66 therebetween. It should be noted that fluid circuit 66 is the sole means for interconnecting cylinders 48a and 48b and that no interconnections between first and second conduits 62 and 64 are utilized.

When the vehicle, equipped with anti-roll system 42 of the present invention, is maneuvered around a corner, the sprung portion of the vehicle will rotate in a first direction relative to the unsprung portion, thereby tending to extend rod 56a from cylinder 48a and retract rod 56b from cylinder 48b. The extension of rod 56a from cylinder 48a will cause its piston 54a to push fluid from lower fluid chamber 30a in cylinder 28a into second fluid conduit 64. This, in turn, causes fluid to enter upper fluid chamber 58b of cylinder 48b, which tends to push its piston 54b down. Movement of piston 54b in cylinder 48b in this direction causes fluid to flow out of lower chamber 60b in cylinder 48b and into first fluid conduit 62 which, in turn, tends to push fluid into upper chamber 58a of cylinder 48a. This transfer of fluid between the laterally opposite cylinders 48a and 48b tends to level the sprung portion of the vehicle. Fluid in fluid circuit 66 will continue to distribute itself in this manner until the forces exerted on pistons 54a, 54b by the fluid in their associated upper and lower fluid chambers reaches a substantial equilibrium. The natural tendency of the system to reach equilibrium eliminates the need for costly pumps which would increase the load on the engine and reduce fuel economy.

Preferably, anti-roll system 42 is tuned to the vehicle to optimize its performance. Tuning effectively varies the response of anti-roll system 42, eliminating the sudden shifting of the sprung portion as well as preventing the individual motions of one wheel 44 from being copied to the laterally opposite wheel 44. Tuning is accomplished through a tuning apparatus 68 which causes the equilibrium forces to vary as a function of the displacement of the individual pistons wherein the equilibrium forces increase as piston displacement increases.

As shown in FIGS. 2 and 3, tuning apparatus 68 includes compression springs 70a and 70b. Compression springs 70a, 70b are concentrically disposed about rods 56a, 56b and are located in corresponding lower fluid chambers 60a, 60b of cylinders 48a and 48b. Tuning through this method is highly desirable due to the flexibility associated with the use of compression springs. For example, a change in the tuning rate can easily be achieved by changing the spring rate or the length of one or both of compression spring 70a, 70b. However, other turning methods can also be effectively employed to tune the response of anti-roll system 42, either singly or in combination. For example, expandable bladders (not shown) could be incorporated into first and second conduits 62 and 64, respectively. These expandable bladders would function as fluid-powered "springs" and would provide tuning characteristics similar to those provided by the compression springs 70. Another type of tuning apparatus 68 is a resilient member (not shown) coupled to at least one side of each piston. The resilient member would deform or expand in response to changes in the fluid pressure in the upper and lower chambers of cylinders 48a, 48b. A further tuning apparatus 68 would be the use of a compressible fluid, either wholly or in partly in combination with an incompressible fluid, which would provide the desired tuning rate though compression of the compressible fluid during movement of the pistons. Moreover, the tuning can be different for each lateral side of anti-roll system 42, if so desired.

Referring now to FIG. 4, a partial diagrammatical view of an anti-roll system 42' according to an alternate embodiment of the present invention is shown. Anti-roll system 42' is similar to anti-roll system 42 but also includes a valve 80 which is placed in fluid circuit 66 and arranged to define a pair of first conduits 62a and 62b as well as a pair of second conduits 64a and 64b. Preferably, valve 80 has a valve element 82 that is moveable between a first position and a second position for respectively defining a "recirculate" mode and a "cross-flow" mode of operation for anti-roll system 42'. With valve element 82 in its first position, fluid flow is permitted between conduits 62a and 64a and between conduits 62b and 64b to provide recirculation paths between the upper and lower chambers of each of cylinders 48a and 48b. Furthermore, location of valve element 82 in its first position prevents fluid communication between conduits 62a and 62b as well as between 64a and 64b, thereby establishing the recirculate mode wherein fluid communication between cylinders 48a and 48b is interrupted. In this manner, anti-roll system 42' is effectively disabled.

In contrast, with valve element 82 in its second position, fluid flow is permitted between first conduits 62a and 62b as well as between second conduits 64a and 64b while fluid communication between conduits 62a and 64a and between conduits 62b and 64b is prevented. Thus, with valve element 82 in its second position, anti-roll system 42' operates in its cross-flow mode and is effectively activated. Valve element 82 is normally located in its first position and is only shifted to its second position when the vehicle is subjected to a centrifugal force exceeding a predetermined threshold value. With anti-roll system 42 disabled, suspension system 10 provides all damping of movement between the sprung and unsprung portions of the vehicle. In contrast, activation of anti-roll system causes it to work in conjunction with suspension system 10 to control roll conditions.

Referring to FIG. 5, valve 80 is shown as a mechanically-actuated valve 82 which relies on a pendulum-type movement of an inertia-sensitive actuator 84 to open and close flow paths in a valve element 86. Valve element 86 is shown located in its centered position whereat the recirculate mode of valve 82 is established. However, valve element 86 is movable in either direction (based on the direction of roll) from its centered position to an actuated position whereat the cross-flow mode of valve 82 is established. Thus, use of mechanically-actuated valve 82 in anti-roll system 42' facilitates automatic shifting between the recirculate and cross-flow modes in response to centrifugal forces exerted on inertia-sensitive actuator 84. Alternatively, as shown in FIG. 6, valve 80 can be an electrically-actuated two-position servo-valve 88 whose control is based upon the dynamic condition of the vehicle as determined based on input signals from various sensors located throughout the vehicle. These sensors could include lateral accelerometers, steering wheel position sensors and/or vehicle speed sensors. A solenoid 90 of electronically controlled servo-valve 88 is coupled to an electronic control module 92 through leads 94. As shown, controller 92 receives input signals from the various onboard sensors 96. Solenoid 90 is operable in a power-off mode to locate a movable valve element 98 in a first position (shown) so as to establish the recirculate mode. However, when sensors 96 detect vehicle dynamics indicative of an excessive roll condition, solenoid 92 receives electrical power from controller 92 and causes valve element 98 to move from its first position to a second position, thereby establishing the cross-flow mode of operation.

Configuration of anti-roll systems 42' in the manner described above provides anti-roll capabilities when the vehicle is subjected to centrifugal forces, but prevents the impulsive forces encountered by an individual wheel from being transmitted to the laterally opposite wheel during normal highway driving.

While the invention has been described in the specification and illustrated in the drawings with reference to several embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the description of the appended claims.

What is claimed is:

1. An anti-roll system for a vehicle having a sprung portion and an unsprung portion, said unsprung portion including a first wheel and a laterally opposed second wheel, said system comprising:

a first double-acting cylinder having a housing, a rod, a single piston disposed within said housing and fixed to said rod, said single piston and said housing combining to form an upper fluid chamber and a lower fluid chamber, said cylinder coupled to one of said sprung and unsprung portions and said rod coupled to the other thereof such that vertical movement of said first wheel causes said upper and lower fluid chambers to vary in volume;

a second double-acting cylinder having a housing, a rod, a single piston disposed within said housing and fixed to said rod, said single piston and said housing combining to form an upper fluid chamber and a lower fluid chamber, said second cylinder coupled to one of said sprung and unsprung portions and said rod coupled to the other thereof such that vertical movement of said second wheel causes said upper and lower fluid chambers to vary in volume;

a fluid circuit interconnecting said first and second cylinders, said fluid circuit having first and second conduits wherein said first conduit couples said upper fluid chamber of said first cylinder to said lower fluid chamber of said second cylinder and said second conduit couples said lower fluid chamber of said first cylinder to said upper fluid chamber of said second cylinder; and a tuning apparatus for tuning the response of the system, said tuning apparatus being non-weight bearing and positioned in said lower fluid chamber of said first or second double-acting cylinder said tuning apparatus including an element acting on said piston.

2. The anti-roll system of claim 1 wherein said tuning apparatus includes a compression spring coupled to at least one of said first and second cylinders.

3. The anti-roll system of claim 1 wherein said tuning apparatus includes a compressible fluid.

4. The anti-roll system of claim 1 wherein said tuning apparatus includes a resilent member coupled to at least one of said pistons.

5. The anti-roll system of claim 1 further including a valve for preventing the flow of fluid between said first and second cylinders unless the vehicle is exposed to a centrifugal force which exceeds a predetermined value.

6. The anti-roll system of claim 5 wherein said valve enables fluid to flow between said upper and lower fluid chambers of said first cylinder and between said upper and lower fluid chambers of said second cylinder when the vehicle is exposed to a centrifugal force below said predetermined value.

7. A vehicle comprising:

a sprung portion;

an unsprung portion having a first wheel and a second wheel laterally opposed to said first wheel;

an anti-roll apparatus having a first double-acting cylinder having a housing, a rod, a single piston disposed within said housing and fixed to said rod, said single piston and said housing combining to form an upper fluid chamber and a lower fluid chamber, said cylinder coupled to said sprung and unsprung portions such that vertical movement of said first wheel causes said upper and lower fluid chambers to vary in volume; a second double-acting cylinder having a housing, a rod, a single piston disposed within said housing and fixed to said rod, said single piston and said housing combining to form an upper fluid chamber and a lower fluid chamber, said second cylinder coupled to said sprung and unsprung portions such that vertical movement of said second wheel causes said upper and lower fluid chambers to vary in volume; and a single fluid circuit being the sole means for interconnecting said first and second cylinders, said fluid circuit having first and second circuit portions wherein said first circuit portion couples said upper fluid chamber of said first cylinder to said lower fluid chamber of said second cylinder and said second circuit portion couples said lower fluid chamber of said first cylinder to said upper fluid chamber of said second cylinder; and a tuning apparatus for tuning the response of the system, said tuning apparatus being non-weight bearing and positioned in said lower fluid chamber of said first or second double-acting cylinder, said tuning apparatus including an element acting on said piston.

8. The vehicle of claim 7 wherein said tuning means includes a compression spring coupled to at least one of said first and second cylinders.

9. The vehicle of claim 7 wherein said tuning means includes a compressible fluid.

10. The vehicle of claim 7 wherein said tuning means includes a resilent member coupled to at least one of said pistons.

11. The vehicle of claim 7 wherein said single fluid circuit includes a valve for preventing the flow of fluid between said first and second cylinders unless said apparatus is exposed to a centrifugal force which exceeds a predetermined value.

12. The vehicle of claim 11 wherein said valve enables fluid to flow between said upper and lower fluid chambers of said first cylinder and between said upper and lower fluid chambers of said second cylinder unless said apparatus is exposed to a centrifugal force which exceeds said predetermined value.

* * * * *